(12) United States Patent
Zhang et al.

(10) Patent No.: US 9,986,560 B2
(45) Date of Patent: May 29, 2018

(54) METHOD FOR ALLOCATION OF TIME TRANSMISSION INTERVALS

(71) Applicant: Telefonaktiebolaget LM Ericsson (publ), Stockholm (SE)

(72) Inventors: Zhang Zhang, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 15/039,882

(22) PCT Filed: Nov. 27, 2013

(86) PCT No.: PCT/CN2013/087908
§ 371 (c)(1),
(2) Date: May 27, 2016

(87) PCT Pub. No.: WO2015/077930
PCT Pub. Date: Jun. 4, 2015

(65) Prior Publication Data
US 2017/0026963 A1  Jan. 26, 2017

(51) Int. Cl.
*H04W 72/04* (2009.01)
*H04B 17/318* (2015.01)
(Continued)

(52) U.S. Cl.
CPC ...... *H04W 72/0446* (2013.01); *H04B 17/318* (2015.01); *H04W 28/0268* (2013.01);
(Continued)

(58) Field of Classification Search
USPC ......... 455/522, 442; 370/331, 329, 328, 201
See application file for complete search history.

(56) References Cited

U.S. PATENT DOCUMENTS

2006/0092876 A1* 5/2006 Kwak ............... H04W 72/1226
370/329
2006/0146745 A1* 7/2006 Cai ..................... H04L 12/1881
370/328
(Continued)

FOREIGN PATENT DOCUMENTS

| CN | 102948236 A | 2/2013 |
| WO | 2011092370 A1 | 8/2011 |
| WO | 2013170760 A1 | 11/2013 |

OTHER PUBLICATIONS

Nakano, Toshihiko et al., "Downlink Power Allocation with CSI Overhearing In an OFDMA Macrocell/Femtocell Coexisting System", IEEE 23rd International Symposium on Personal, Indoor and Mobile Radio Communications, Sep. 2012, 454-459.
(Continued)

*Primary Examiner* — David Q Nguyen
(74) *Attorney, Agent, or Firm* — Murphy, Bilak & Homiller, PLLC

(57) ABSTRACT

The present disclosure relates to a method for allocating Time Transmission Intervals, TTI, during Up Link, UL, transmissions in a shared radio cell environment. The present disclosure also relates to a network node for performing said allocation method. The allocation is performed by determining for each network node (10; 20A; 20B; 20C) in the shared radio cell environment which UEs (30) it serves and listens to. The TTIs are the allocated such that the UE transmission for UEs related to a network node (10; 20A; 20B; 20C) is coordinated by scheduling said UE transmission in the same TTI frame for a serving network node (10; 20A; 20B; 20C) and for one or more of listening network nodes (10; 20A; 20B; 20C) in the shared radio cell environment.

16 Claims, 2 Drawing Sheets

(51) Int. Cl.
*H04W 28/02* (2009.01)
*H04W 52/36* (2009.01)
*H04W 84/04* (2009.01)
*H04W 72/08* (2009.01)

(52) U.S. Cl.
CPC ..... *H04W 52/365* (2013.01); *H04W 72/0413* (2013.01); *H04W 72/082* (2013.01); *H04W 84/042* (2013.01)

(56) References Cited

U.S. PATENT DOCUMENTS

| | | | | |
|---|---|---|---|---|
| 2009/0196162 | A1* | 8/2009 | Sambhwani | H04B 1/7103 370/201 |
| 2009/0275337 | A1* | 11/2009 | Maeda | H04W 36/18 455/442 |
| 2010/0099431 | A1 | 4/2010 | Sampath et al. | |
| 2011/0038352 | A1* | 2/2011 | Bergman | H04L 1/1812 370/331 |
| 2012/0093096 | A1 | 4/2012 | Barbieri et al. | |
| 2012/0157152 | A1* | 6/2012 | Blomgren | H04W 52/146 455/522 |
| 2016/0255560 | A1* | 9/2016 | Kangas | H04W 28/22 455/442 |

OTHER PUBLICATIONS

Nakano, Toshihiko et al., "Interference Mitigation based on Partial CSI Feedback and Overhearing in an OFDMA Heterogeneous System", IEEE 77th Vehicular Technology Conference, Jun. 2013, 1-5.

Unknown, Author, "Overview of Combined Cell Deployment in Heterogeneous Networks", 3GPP TSG RAN WG1 Meeting #72, R1-130610, Ericsson, St. Julian's, Malta, Jan. 28-Feb. 1, 2013, 1-12.

* cited by examiner

METHOD FOR ALLOCATION OF TIME TRANSMISSION INTERVALS

TECHNICAL FIELD

Various embodiments of the present disclosure relate to a method for allocating Time Transmission Intervals, TTI, during UpLink, UL, transmissions in a shared radio cell environment. The present disclosure also relates to a network node for performing said allocation method.

BACKGROUND

A cellular network or mobile network is a network distributed over different land areas, which are called radio cells. Each radio cell is each served by at least one fixed-location base station. In the cellular network, each radio cell uses a different set of frequencies in relation to its neighboring radio cells in order to avoid interference and provide guaranteed bandwidth within each radio cell. In this traditional setup of cellular networks there are no problems with interference, since neighboring radio cells use different frequencies.

Lately the development of heterogeneous networks using combined radio cells, also called shared radio cells, has increased rapidly. In heterogeneous networks or shared radio cell environments a radio macro cell covering a large area is complemented within said large area with for example radio pico-cells served by pico-base stations. The combined radio cell cellular network allows operators to configure multiple radio cells with partially overlapping coverage as one 'radio cell carrier'. The same downlink signal is transmitted on each downlink radio channel, and the uplink signal is jointly decoded from the different radio cells. These radio pico-cells may be used to cover blind spots underneath a macro sector, or to minimize the number of separate radio cell carriers required in coverage limited scenarios. Compared to separate radio cells, the shared radio cell may have fewer radio cells in the Radio Network Controller, RNC, less mobility signaling, and smooth radio cell split if traffic increases.

However, one drawback with this setup is that all User Equipments, UEs, belonging to the same combined or shared radio cell, i.e. either the radio macro cell or any of the radio pico-cells within the radio macro cell, have to share the same uplink load resource in this combined radio cell. With Time Division Multiplexing, TDM, scheduling, the chance for each UE to be scheduled without increased transmission latency and delay will decrease. This is due to the fact that the number of the served users in a shared radio cell environment is much greater than in a traditional cellular network. The shared radio cell environment will thus contribute to increasing connectivity for UEs, but may also create a bottleneck if there are many UEs within the shared radio cell environment. Thus, it would be great if one could use the shared radio cell environment without the drawback of increasing transmission latency and delay.

SUMMARY

One way to solve the above mentioned problem with transmission latency and delay is that UEs in the same shared radio cell environment are grouped together, wherein each group may be served by any one of the base station or micro base stations based on some available measure and each base station or micro base station then performs separate and independent load control and scheduling only for UEs that are grouped together and associated to that base station or micro base station. In this way it is possible with spatial reuse between user groups/base stations and each UE has a better chance to be scheduled. The inventors also realized that in order to further improve the performance of UL transmissions one has to consider interference between the different groups of UEs. UEs which have similar path gain to multiple base stations or micro base stations may generate fairly strong interference to the UEs served by other base stations or micro base stations.

Accordingly, the problem to be solved is to diminish the interference during spatial reuse in a shared radio cell environment.

Thus, according to one aspect of the present disclosure a method performed by a network node for allocating Time Transmission Intervals, TTI, during uplink transmission is accomplished. The network node is one of several network nodes in a shared radio cell environment and serves a first radio cell and controls the other network nodes in the shared radio cell environment, which other network nodes serve other radio cells. Each network node serves a group of User Equipments, UEs, for uplink transmission and each network node acts as a serving network node for all UEs in the group served by said network node and as a listening network node for UEs served by other network nodes, if said network node receives UE transmissions from UEs served by other network nodes. The method comprises determining, for each serving network node, if it also acts as listening network node for UEs not served by this serving network node, and allocating TTIs such that the UE transmission for UEs having both a serving network node and one or more listening network nodes is coordinated by scheduling said UE transmission in the same TTI frame for the serving network node and said one or more listening network nodes in the shared radio cell environment.

The method may according to exemplary embodiments further comprise, determining which network node acting both as serving network node and as listening network node within the shared radio cell environment that receives most UE transmissions, and in response thereto allocating TTIs for all UEs, for which this determined network node is either the serving network node or the listening network node prior to allocating TTIs for UEs of all other network nodes in the shared radio cell environment.

In yet other exemplary embodiments the method further comprises determining which network node acting as both serving network node and as listening network node of the not yet scheduled network nodes within the shared radio cell environment that receives most UE transmissions, and in response thereto allocating TTIs for all UEs, for which this determined network node is either the serving network node or the listening network node, prior to allocating TTIs for UEs of the network nodes that have not previously been scheduled.

The determination of listening network nodes may comprise measuring an uplink signal strength in the dedicated physical control channel, measuring a quality of probing pilots sent from the network node or measuring a load headroom.

According to another aspect of the present disclosure a network node for allocating Time Transmission Intervals, TTI, during uplink transmission is accomplished. The network node is one of several network nodes in a shared radio cell environment and serves a first radio cell and controls the other network nodes in the shared radio cell environment. The other network nodes serve other radio cells. Each network node serves a group of User Equipments, UEs, for uplink transmission and each network node acts as a serving network node for all UEs in the group served by said network node and as a listening network node for UEs served by other network nodes if said network node receives UE transmissions from UEs served by other network nodes. The network node comprises a communication interface arranged for wireless communication with said network nodes, a processor and a memory storing a software package comprising computer program code which, when run in the processor, causes the network node to determine, for each serving network node if it also acts as listening network node for UEs not served by the serving network node, and allocate TTIs such that the UE transmission for UEs having both a serving network node and one or more listening network nodes is coordinated by scheduling said UE transmission in the same TTI frame for the serving network node and said one or more listening network nodes in the shared radio cell environment.

The network node may according to exemplary embodiments further be caused to determine which network node acting as both serving network node and as listening network node within the shared radio cell environment that receives most UE transmissions, and in response thereto allocate TTIs for all UEs, for which this determined network node is either the serving network node or the listening network node prior to allocating TTIs for UEs of all other network nodes in the shared radio cell environment.

The network node may furthermore be caused to determine which network node acting as both serving network node and as listening network node of the not yet scheduled network nodes within the shared radio cell environment that receives most UE transmissions, and in response thereto allocate TTIs for all UEs, for which this determined network node is either the serving network node or the listening network node prior to allocating TTIs for UEs of network nodes that have not previously been scheduled.

By providing a method as described above a TTI allocation method is advantageously achieved which diminishes the interference during spatial reuse in a shared radio cell environment. Thus, the method creates a good balance between spatial reuse and the orthogonality between different base stations in a shared radio cell environment, i.e. spatial reuse is adopted such that a of sufficient orthogonality achieved.

BRIEF DESCRIPTION OF THE DRAWINGS

These and other aspects, features and advantages of embodiments of the present disclosure will be apparent and elucidated from the following description of various embodiments, reference being made to the accompanying drawings, in which.

DETAILED DESCRIPTION

Figure 1:
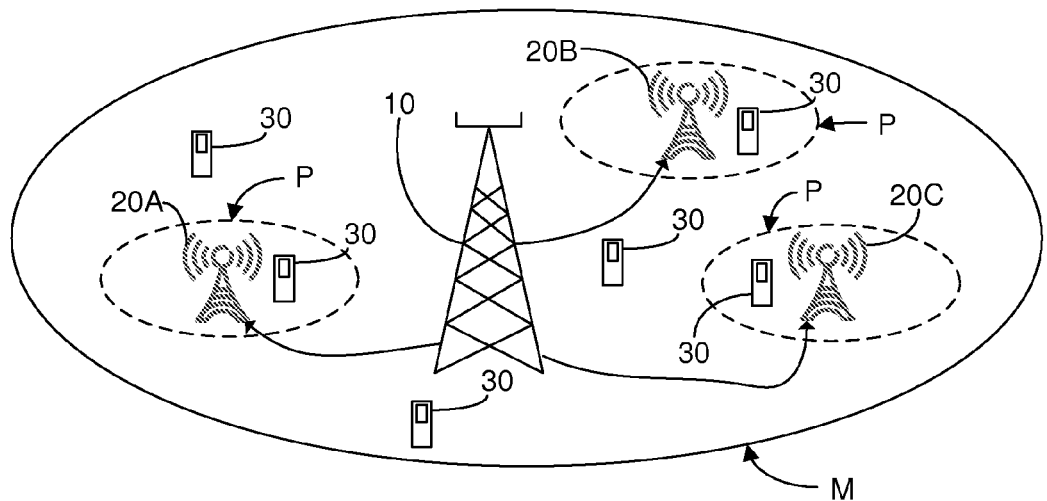
FIG. 1 is a schematic view of a shared radio cell environment.

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Before describing the present invention in detail a short technical background will be given relating to load control, scheduling and interference. The interference in for example a Wideband Code Division Multiple Access, WCDMA, uplink, is limited by the amount of tolerable interference that the common radio resource that is shared among the UEs is capable to handle. The tolerable interference is defined as the average interference over all the antennae. A relative measure of total interference is Rise over Thermal, RoT, i.e. total interference relative to thermal noise. In the WCDMA uplink the UEs are non-orthogonal to each other, i.e. the UEs generate interference to each other even if they are within the same radio cell. Therefore the system needs to have an upper interference limitation, i.e. a limit where the radio cell RoT cannot be increased any more in order to achieve sufficient coverage at the radio cell border. This of course limits the maximum radio cell capacity. This limitation is also denoted as target RoT.

A load factor represents a portion of an uplink interference that a specific channel of a specific UE generates. The load factor is defined as the interference from this specific UE on this specific channel divided by the total interference. The total load factor of different channels equals to the sum of load factors of each specific channel.

A load controller estimates how the load resources in the radio cell are used and how much load resources that are available for the radio cell without the risk of exceeding the load target of that specific radio cell, which load target may be the RoT target. The load controller delivers an estimated available load headroom to a scheduler and the uplink scheduler determines the maximum data rate that can be supported for a specific UE in the each radio cell so that the maximum available load room is sufficiently but not excessively used. This is also called load headroom to rate mapping. This type of controlling may be implemented by determining the supportable power offset between the channel to be scheduled and the Dedicated Physical Control CHannel, DPCCH, which is a fixed rate channel. The supportable data rate is then determined based on the granted power offset.

In order to avoid interference between UEs in the same radio cell, UE data transmissions may be separated in time by using a Time Division Multiplexing, TDM scheme. The technology takes advantage of the ability to grant uplink transmissions for active UEs that are only valid for a specific Hybrid Automatic Repeat Request, HARQ, process. By separating the shared radio resources in time the possibility to transmit very high data rates increases. TDM scheduling may be used for performing soft handover in view of a serving radio cell. In non-serving radio cells or in listening radio cells the UEs are still code multiplexed with concurrent transmissions. A listening radio cell is a radio cell that receives UE transmissions from UEs already served by a serving radio cell. In order to properly decode the transmission from the UEs not served by the serving radio cell one would have to inform the listening cells about the TDM scheduling pattern for the non-served UEs. Since WCDMA in general is asynchronous, the HARQ processes in different radio cells will not be time aligned. This makes it complicated for a listening radio cell to determine in which HARQ process of the listening radio cell the UE is scheduled to transmit. It would be easier to schedule the UE in a Code Division Multiplexing, CDM, manner, but to the price of decreased orthgonality between UEs and users and increased intra-radio cell interference.

In heterogeneous networks there are basically two modes of operation, either separate radio cell operation or combined radio cell operation. In a separate radio cell operation mode each radio pico-cell operates as a separate radio cell in relation to the radio macro cell. With combined radio cell operation, the macro and the pico cell(s) are operated as one logical radio cell.

In FIG. 1 an exemplary shared radio cell environment is shown. The shared radio cell environment comprises a base station 10, a number of pico base stations 20A, 20B and 20C and UEs 30. The base station 10 serves a radio macro cell M, shown with an unbroken line and the pico base stations 20A, 20B and 20C serve radio pico-cells P shown with dotted lines. In total there are six UEs shown in FIG. 1, but in reality there are of course usually much more UEs 30 present. However, for illustration purposes and in the sake of simplicity it will be enough to show six UEs 30. The base station 10 is capable of serving all six UEs 30 within the radio macro cell M, and each pico base station 20A, 20B, and 20C may each a UE 30 that is within the boarders of the radio pico-cell P, respectively. In this exemplary embodiment the UEs 30 may be grouped together in different groups depending on the base station 10, 20A, 20B or 20C that serves the UEs 30. Preferably, the UEs 30 within the radio pico-cells P are served by its respective pico base station 20A, 20B and 20C the UEs that are not situated within any of the radio pico-cells P are served by the base station 10. How the transmissions between different UE 30 groups are coordinated will be described below in conjunction with FIGS. 3 and 4. In context of the present application the terms base station and the pico base stations should only be interpreted as exemplary and could actually be any suitable network node such as a radio base station, an evolved Node B, eNB, a home eNB, HeNB, a NB, a HNB, a pico, micro or femto base station.

Figure 2:
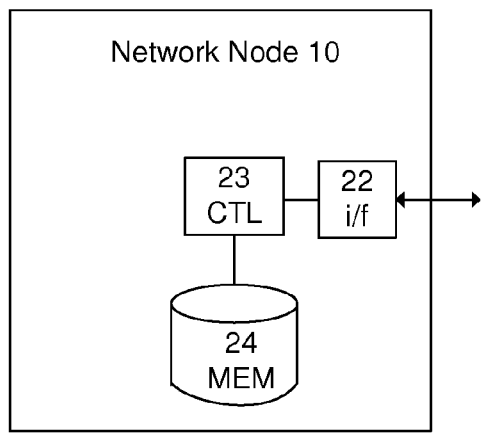
FIG. 2 is a schematic view of a network node.

In FIG. 2 is a schematic view of an exemplary network node 10 is shown. The network nodes 20A, 20B,and 20C could be described in a corresponding way. The exemplary network node 10 comprises a controller (CTL) or a processor 23 that may be constituted by any suitable Central Processing Unit, CPU, microcontroller, Digital Signal Processor, DSP, etc., capable of executing a computer program comprising computer program code. The computer program may be stored in a memory (MEM) 24. The memory 24 may be any combination of a Read And write Memory, RAM, and a Read Only Memory, ROM. The memory 24 may also comprise persistent storage, which, for example, can be any single one or combination of magnetic memory, optical memory, or solid state memory or even remotely mounted memory. The network node 10 further comprises a communication interface (i/f) 22 arranged for establishing a communication link with other devices or network nodes, such as entities in the core network or the backhaul network or the network nodes 20A, 20B and 20C. When the above-mentioned computer program code is run in the processor 23 of the network node, it causes the network node 10 to determine if other network nodes within the radio macro node act as a listening network node and to allocate TTIs in depending on said determination. Which all will be closer described in conjunction with FIGS. 3 to 6.

The way of allocating TTIs for different network nodes will now be more closely described. In a first step a determination is made to establish if a serving network node, such as the base station 10, also acts as a listening network node. In the example depicted in FIG. 1 the network node 10 may serve all UEs that are not within a radio pico-cell P, in this case three different UEs 30. These three UEs are grouped together. The three other UEs are placed in groups belonging to each radio pico-cell P, respectively. However, the transmissions of these last mentioned groups of UEs 30 may also be received and decoded by the base station 10, despite the fact that they have other network nodes serving them. In the case where the base station also receives and decodes transmissions from other UEs not served by the base station 10 it will also be defined as a listening node for these UEs 30. The transmission from such UEs may generate strong interference to the UEs served by the base station. Therefore special care has to be taken in order to handle this high interference. There are many different ways to determine if the serving network node also acts as a listening network node, such as the strength of uplink signal in the DPCCH, the quality of probing pilots, the load headroom or the target RoT of the network node in question, as well as the traffic load served by each network node.

The following examples may illustrate the different ways to determine if the serving network node also is a listening network node. For example, suppose that the estimated uplink signal strength from a UE received by its serving network node is $S_{serve}$ and that the quality of the probing pilot of the serving network node estimated by the UE is $Q_{serve}$. The serving network node will always be regarded as the effective network node for effectively receiving the UE transmission. Another network node within the same shared radio cell M that is examined may be regarded as the listening network node of the UE if the following conditions satisfied:

$$S_{exam} > S_{serve} * k_1 \text{ and/or } Q_{exam} > Q_{serve} * k_2 \qquad (1)$$

where:
  $S_{exam}$ is the uplink signal strength estimated by the examined network node
  $Q_{exam}$ is the UE estimated quality of the probing pilot sent from the examined network node, and
  $k_1$ and $k_2$ are configurable parameters.

Furthermore, as mentioned above it is also possible to use the load headroom as a determining parameter. Suppose that the available load headroom for the serving network node and the network node to be examined are $L_{serve}$ and $L_{exam}$ respectively. The examined network node may be regarded as the listening network node of the UE if the following conditions satisfied:

$$S_{exam}/S_{serve} > (L_{exam}/L_{serve})^{n_1} * p_1 \text{ and/or } Q_{exam}/Q_{serve} > (L_{exam}/L_{serve})^{n_2} * p_2 \qquad (2)$$

where:
  $n_1$, $n_2$, $p_1$ and $p_2$ are all configurable parameters. Equation (2) becomes the same as Equation (1), i.e. the judgment will only be based on signal strength and/or the probing pilot, if $n_1$ and/or $n_2$ are set to 0.

Figure 3:
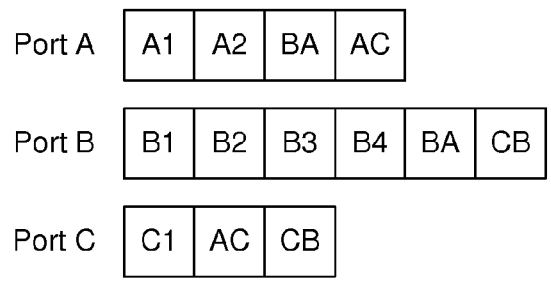
FIG. 3 is a schematic view illustrating an example of allocating TTIs for different nodes.
Figure 4:
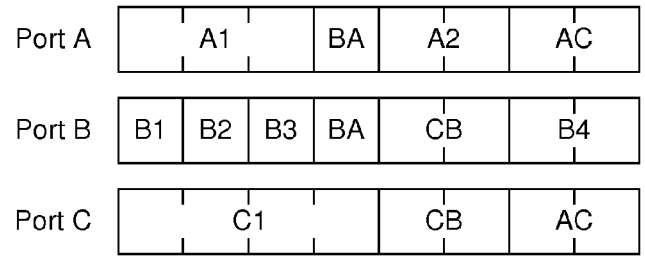
FIG. 4 is a schematic view illustrating another example of allocating TTIs for different nodes.

Thus, it has been described how to determine if the serving network also acts as a listening network node which is used for performing scheduling. To fully understand how scheduling is performed two non-limited examples as illustrated in FIG. 3 and FIG. 4. In the example in FIG. 3 there are three different network nodes A, B and C. Network node A is the serving network node for two UEs $A_1$ and $A_2$ and also acts as the listening network node for UEs BA and AC. Network node B is the serving network node for the UEs $B_1$, $B_2$, $B_3$ and $B_4$ and also acts as the listening network node for UEs BA and CB. Network node C is the serving network node for UE $C_1$ and also acts as listening network node for UEs AC and CB. Now when scheduling is performed it is important to determine if the serving network node also acts as a listening network node in order to take into account the transmissions received by UEs that are not served by the serving network node. One way to perform scheduling is to independently schedule all UEs for which the network node acts both as the serving network node and the listening network node in the same way. As for the example in FIG. 3 Network node A will schedule the four UEs $A_1$, $A_2$, BA and AC in the same way, network node B will schedule the six UEs $B_1$ to $B_4$, BA and CB in the same way, and network node C will schedule the three UEs $C_1$, AC, and CB in the same way. If the scheduling principle now would be based on equal resource sharing, i.e. each UE occupies the same number of (HARQ processes) TTIs if it is possible, there may be a risk of conflict between different network nodes as the following example illustrates. In network node A UE BA and AC will each be allocated 2 TTIs, in network node B UE BA and CB will each be allocated 1 or 2 TTIs and in network node C UE AC and CB each will be allocated 2 or 3 TTIs and at least one of them will have 3 TTIs. Clearly there will be a conflict if different numbers of TTIs are allocated for the same UE in different network nodes. For example since at least one of UE AC and CB will be allocated 3 TTIs in the network node C, while these UEs AC and CB can only be allocated 2 TTIs in the other two network nodes A and B, conflict is unavoidable. An exemplary embodiment solves this problem by always allocating 1 TTI for the UEs where the serving network node also acts as a listening network node. This is a nice solution but may further be improved since the allocation of only 1 TTI may lead to unfairness, i.e. the data rate of the UEs received by listening network nodes may be to low.

Thus, a further development is to coordinate the UE transmissions in a better way to between the different network nodes. When coordinating the different network nodes one of the network nodes within the shared radio cell environment will act as a controlling network node for the other network nodes. In context of the present invention it may be any of the network nodes that acts as the controlling network node, such as the base station 10 or any of the pico base stations 20A, 20B or 20C. The coordination is performed between the network nodes in the same shared radio cell that also act as listening network nodes. The basic procedure of the coordination starts from the network node that serves and listens to the most number of UEs for which the allocation TTI(s) not yet has been performed. When it has been decided which network node that serves and listens to the greatest number of UEs these UEs are scheduled as normal in said network node. For all UEs having both serving and listening network nodes the same TTI allocation (including the number of TTIs and their positions) will be applied for all the listening network nodes and the serving network node of such UEs. The process will then continue to find the network node which serves and listens to the second most UEs and apply the same TTI allocation method regarding the number and position of the TTIs. This last step will be repeated until all of the network nodes have been scheduled.

To better illustrate the above coordination between and scheduling of the different network nodes an example will now be described in conjunction with FIG. 4. In this example the same network nodes, the same UEs and the same UE grouping are used as in the example illustrated in FIG. 3. It has first to be determined which network node that serves and listens to most UEs, i.e. network node B in this example. Thus, network node B is the network node to be scheduled first. It is assumed that UE BA and CB are allocated 1 TTI and 2 TTIs, respectively. The same allocation, i.e. the number and position of TTIs, will also be applied for UE BA in network node A and for UE CB in network node C. The UEs $B_1$ to $B_3$ are each allocated 1 TTI and UE $B_4$ is allocated 2 TTIs. After the allocation of TTIs for each UE the TTIs for the different UEs are scheduled in time. In this example all UEs having 1 TTI are scheduled first but there may be many other ways to schedule the UEs.

After the allocation and scheduling of network node B it will be determined which network node that serves and listens to the second most UEs, i.e. network node A in the present example. In network node A UE BA has already been scheduled in conjunction with the scheduling of network node B. In the scheduling process of network node A it is further assumed that UE AC is allocated 2 TTIs, which allocation then also will be applied in network node C. UE $A_1$ will be allocated 3 TTIs and UE $A_2$ will be allocated 2 TTIs. Finally network node C will be schedule. UE CB and AC have been previously scheduled, i.e. only UE $C_1$ is left to allocate and schedule. Apparently UE $C_1$ will get the remaining 4 TTIs. It is the final allocation of all the UEs that is depicted in FIG. 4. In the fourth TTI in FIG. 4 it is not possible with spatial reuse between network node A and network node B due to high interference from UE BA. However this will not affect network node C, in which transmission still may be scheduled in this TTI since there is no evident interference between network node C and network node A or B. With the same reasoning it is not possible with spatial reuse in the fifth and sixth TTIs between network node B and network node C, but it is possible for network node A, and in the seventh and eighth TTIs it is not possible with spatial reuse between network node A and network node C, but for network node B.

It is not always needed to coordinate the network nodes, but when UEs are powered on and move into or out of into different radio cells in the shared radio cell environment it may trigger network node coordination. Otherwise each network node may still schedule independently with the determined TTI allocation as in the example in FIG. 3.

Figure 5:
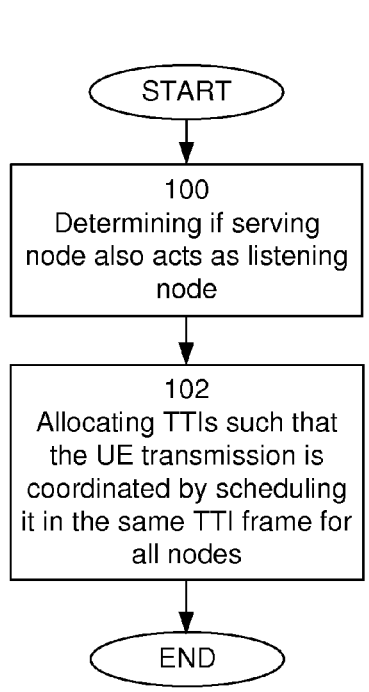
FIG. 5 is a flow chart of a method for allocating TTIs according to an exemplary embodiment.
Figure 6:
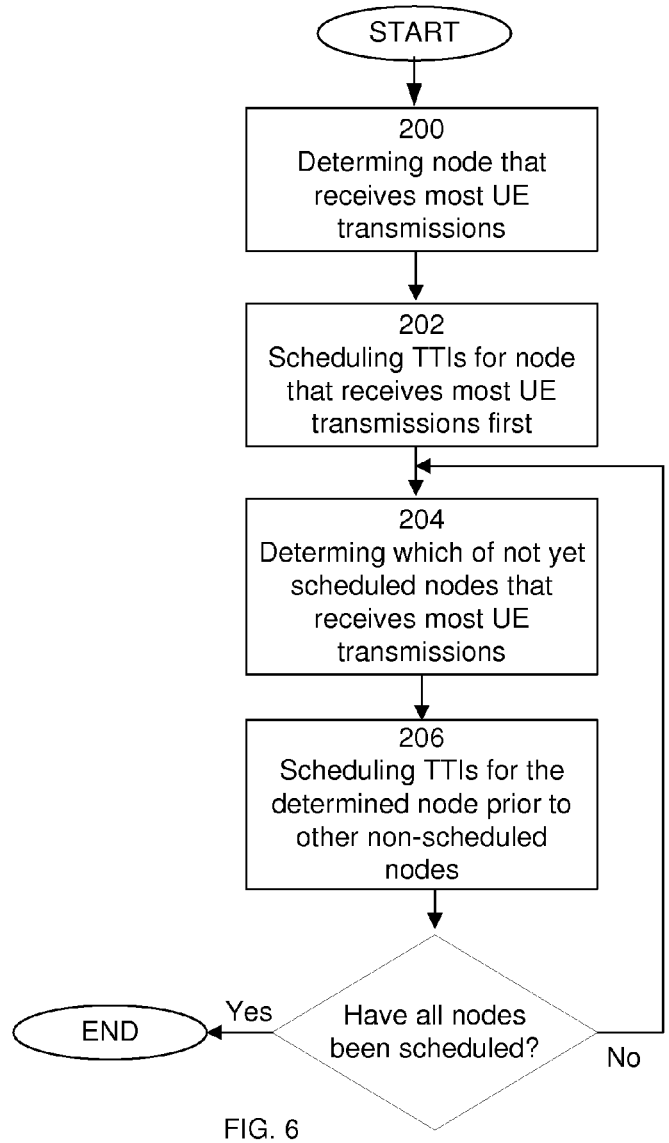
FIG. 6 is a flow chart of another exemplary embodiment of a method for allocating TTIs.

Turning now to FIG. 5 and FIG. 6, the method for allocating TTIs according to exemplary embodiments will be described more closely. As mentioned above the method starts with determining, in step 100, for each serving network node 10; 20A; 20B; 20C if it also acts as listening network node 10; 20A; 20B; 20C for UEs 30 not served by this serving network node 10; 20A; 20B; 20C. Thereafter, in step 102, the method proceeds with allocating TTIs such that the UE transmission for UEs having both a serving network node 10; 20A; 20B; 20C and one or more listening network nodes 10; 20A; 20B; 20C is coordinated by scheduling said UE transmission in the same TTI frame for the serving network node 10; 20A; 20B; 20C and said one or more listening network nodes 10; 20A; 20B; 20C in the shared radio cell environment.

In FIG. 6 the step of determining network nodes is further specified, by determining which of network nodes 10; 20A; 20B; 20C that should be scheduled first. Thus, in step 200 method is determining which network node 10; 20A; 20B; 20C both in the capacity as serving network node and as listening network node within the shared radio cell environment that receives the most UE transmissions and in step 202 allocating TTIs for all UEs, for which the determined network node 10; 20A; 20B; 20C is either the serving network node or the listening network node prior to allocating and scheduling TTIs for UEs of all other network nodes 10; 20A; 20B; 20C in the shared radio cell environment. When the first network node has been scheduled it is time to continuing the scheduling of other network nodes. Thus, in step 204, the method continues with determining which network node 10; 20A; 20B; 20C in the capacity as both serving network node and as listening network node, of the not yet scheduled network nodes (10; 20A; 20B; 20C) within the shared radio cell environment, that receives most UE transmissions, and, in step 206 allocating TTIs for all UEs, for which this determined network node 10; 20A; 20B; 20C is either the serving network node or the listening network node, prior to allocating TTIs for UEs of the network nodes 10; 20A; 20B; 20C that have not previously been scheduled. This last step is repeated until all network nodes have been schedule.

Thus, it is believed that different embodiments have been described thoroughly for purpose of illustration and description. However, the foregoing description is not intended to be exhaustive or to limit example embodiments to the precise form disclosed. Thus, modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The invention claimed is:

1. A method performed by a network node for allocating Time Transmission Intervals (TTIs) during uplink transmission, said network node being one of several network nodes in a shared radio cell environment and serving a first radio cell and controlling the other network nodes in the shared radio cell environment, which other network nodes are serving other radio cells, each network node serving a group of User Equipments (UEs) for uplink transmission and each network node acting as a serving network node for all UEs in the group served by said network node and as a listening network node, for UEs served by other network nodes, if said network node receives UE transmissions from UEs served by other network nodes, said method comprising:
determining, for each serving network node, whether it also acts as listening network node for UEs not served by this serving network node; and
allocating TTIs such that the UE transmission for UEs having both a serving network node and one or more listening network nodes is coordinated by scheduling said UE transmission in the same TTI frame for the serving network node and said one or more listening network nodes in the shared radio cell environment;
wherein the method further comprises:
determining which network node acting as both serving network node and as listening network node within the shared radio cell environment receives the most UE transmissions among such network nodes; and
allocating TTIs for all UEs for which this determined network node is either the serving network node or the listening network node, prior to allocating TTIs for UEs of all other network nodes in the shared radio cell environment.

2. The method of claim 1, further comprising
determining which network node, acting as both serving network node and as listening network node, of the not yet scheduled network nodes within the shared radio cell environment, receives the most UE transmissions among such network nodes; and
allocating TTIs for all UEs, for which this determined network node is either the serving network node or the listening network node, prior to allocating TTIs for UEs of the network nodes that have not previously been scheduled.

3. The method of claim 1, wherein the determination of listening network nodes comprises measuring an uplink signal strength in the dedicated physical control channel.

4. The method of claim 1, wherein the determination of listening network nodes comprises measuring a quality of probing pilots sent from the network node.

5. The method of claim 1, wherein the determination of listening network nodes comprises measuring a load headroom.

6. The method of claim 2, wherein the determination of listening network nodes comprises measuring an uplink signal strength in the dedicated physical control channel.

7. The method of claim 2, wherein the determination of listening network nodes comprises measuring a quality of probing pilots sent from the network node.

8. The method of claim 2, wherein the determination of listening network nodes comprises measuring a load headroom.

9. A network node for allocating Time Transmission Intervals (TTIs) during uplink transmission, said network node being one of several network nodes in a shared radio cell environment and serving a first radio cell and controlling the other network nodes in the shared radio cell environment, which other network nodes are serving other radio cells, each network node serving a group of User Equipments (UEs) for uplink transmission and each network node acting as a serving network node for all UEs in the group served by said network node and as a listening network node, for UEs served by other network nodes, if said network node receives UE transmissions from UEs served by other network nodes, said network node comprising:
a communication interface arranged for wireless communication with said network nodes;
a processor;
and a memory storing a software package comprising computer program code that, when run in the processor, causes the network node to:
determine, for each serving network node if it also acts as listening network node for UEs not served by the serving network node, and allocate TTIs such that the UE transmission for UEs having both a serving network node and one or more listening network nodes is coordinated by scheduling said UE transmission in the same TTI frame for the serving network node and said one or more listening network nodes in the shared radio cell environment;

wherein the computer program code is further configured to cause the network node to:

determine which network node acting as both serving network node and as listening network node within the shared radio cell environment receives the most UE transmissions among such network nodes; and allocate TTIs for all UEs for which this determined network node is either the serving network node or the listening network node, prior to allocating TTIs for UEs of all other network nodes in the shared radio cell environment.

10. The network node of claim 9, wherein the computer program code is further configured to cause the network node to:

determine which network node acting as both serving network node and as listening network node of the not yet scheduled network nodes within the shared radio cell environment receives the most UE transmissions among such network nodes; and allocate TTIs for all UEs, for which this determined network node is either the serving network node or the listening network node prior to allocating TTIs for UEs of network nodes that have not previously been scheduled.

11. The network node of claim 9, wherein the computer program code is further configured to cause the network node to determine the listening network nodes by measuring an uplink signal strength in the dedicated physical control channel.

12. The network node of claim 9, wherein the computer program code is further configured to cause the network node to determine the listening network nodes by measuring a quality of probing pilots sent from the network node.

13. The network node of claim 9, wherein the computer program code is further configured to cause the network node to determine the listening network nodes by measuring a load headroom.

14. The network node of claim 10, wherein the computer program code is further configured to cause the network node to determine the listening network nodes by measuring an uplink signal strength in the dedicated physical control channel.

15. The network node of claim 10, wherein the computer program code is further configured to cause the network node to determine the listening network nodes by measuring a quality of probing pilots sent from the network node.

16. The network node of claim 10, wherein the computer program code is further configured to cause the network node to determine the listening network nodes by measuring a load headroom.

* * * * *